(12) United States Patent
Muhleman

(10) Patent No.: US 12,384,565 B1
(45) Date of Patent: Aug. 12, 2025

(54) LIGHTER-THAN-AIR VEHICLE INTERCEPTOR

(71) Applicant: The United States of America, as represented by the Secretary of the Navy, Arlington, VA (US)

(72) Inventor: Daniel Howard Muhleman, El Cajon, CA (US)

( * ) Notice: Subject to any disclaimer, the term of this patent is extended or adjusted under 35 U.S.C. 154(b) by 0 days.

(21) Appl. No.: 18/805,280

(22) Filed: Aug. 14, 2024

(51) Int. Cl.
- *B64U 10/30* (2023.01)
- *B64B 1/46* (2006.01)
- *B64U 10/13* (2023.01)
- *B64U 101/64* (2023.01)

(52) U.S. Cl.
CPC .......... *B64U 10/13* (2023.01); *B64U 10/30* (2023.01); *B64B 1/46* (2013.01); *B64U 2101/64* (2023.01); *B64U 2201/20* (2023.01)

(58) Field of Classification Search
CPC .... B64U 2101/16; B64U 10/30; B64U 70/20; B64B 1/52; B64B 1/46
See application file for complete search history.

(56) References Cited

U.S. PATENT DOCUMENTS

| | | | |
|---|---|---|---|
| 3,310,982 A | | 3/1967 | Joseph |
| 4,817,001 A | | 3/1989 | Lundquist |
| 6,626,077 B1 | | 9/2003 | Gilbert |
| 6,726,120 B2 | | 4/2004 | Schaffter |
| 8,061,647 B1 | | 11/2011 | Powell |
| 8,251,307 B2 | * | 8/2012 | Goossen ................. B64D 1/22 |
| | | | 244/76 R |
| 8,375,837 B2 | | 2/2013 | Goossen et al. |
| 8,864,063 B2 | * | 10/2014 | Heppe ..................... B64B 1/00 |
| | | | 244/30 |
| 9,421,869 B1 | * | 8/2016 | Ananthanarayanan ...... |
| | | | B60L 5/005 |
| 9,540,091 B1 | | 1/2017 | Maccallum |
| 9,658,618 B1 | | 5/2017 | Knoblach |
| 9,665,103 B1 | | 5/2017 | Bonawitz |
| 9,932,110 B2 | * | 4/2018 | McNally ................ H02G 1/02 |
| 10,099,561 B1 | * | 10/2018 | Ananthanarayanan ...... |
| | | | B60L 53/126 |

(Continued)

FOREIGN PATENT DOCUMENTS

GB          105581 A       3/1916

OTHER PUBLICATIONS

Furfaro, Roberto, et al., "Wind-based navigation of a hot-air balloon on Titan: A feasibility study", article No. 69600C in Proceedings of SPIE—The International Society for Optical Engineering, May 2008.

(Continued)

*Primary Examiner* — Brian M O'Hara
(74) *Attorney, Agent, or Firm* — Naval Information Warfare Center Pacific; Kyle Eppele; Paul C. Oestreich

(57) ABSTRACT

The present invention provides a lighter-than-air (LTA) vehicle interceptor for neutralizing and/or capturing a non-cooperative LTA vehicle, such as a spy balloon. Embodiments of the interceptor may be equipped with various subsystems useful in missions to intercept, neutralize and ideally capture a threat payload attached to the non-cooperative LTA vehicle, even at stratospheric altitudes. Such subsystems may include an imaging device, severing effector, grasping effector, puncturing effector, weight-bearing apparatus, power subsystem, navigation subsystem, communication subsystem and propulsion.

24 Claims, 3 Drawing Sheets

(56) References Cited

U.S. PATENT DOCUMENTS

| | | | | |
|---|---|---|---|---|
| 10,113,823 | B2 | 10/2018 | Alicea, Jr. | |
| 10,168,159 | B2 | 1/2019 | Ribeiro | |
| 10,404,353 | B2 | 9/2019 | Van Wynsberghe | |
| 10,407,182 | B1* | 9/2019 | Alcorn | B64F 1/362 |
| 11,079,773 | B2 | 8/2021 | Muhleman | |
| 11,358,718 | B2* | 6/2022 | Yoon | B64B 1/50 |
| 11,579,610 | B2* | 2/2023 | Fisher | F41G 7/224 |
| 11,608,169 | B2* | 3/2023 | Beiro | B64D 1/22 |
| 11,772,795 | B1* | 10/2023 | Slocum | B64C 39/024 |
| 12,111,137 | B2* | 10/2024 | Theiss | B64U 70/30 |
| 12,122,514 | B2* | 10/2024 | Pagliccia | B64D 1/02 |
| 2018/0335779 | A1 | 11/2018 | Fisher et al. | |
| 2019/0360783 | A1 | 11/2019 | Whittaker | |
| 2020/0062392 | A1 | 2/2020 | Yoon | |
| 2021/0253253 | A1* | 8/2021 | Theiss | B64D 5/00 |
| 2023/0091234 | A1* | 3/2023 | Taupin | B64U 70/20 244/75.1 |
| 2025/0141270 | A1* | 5/2025 | Oqab | H02J 50/40 |

OTHER PUBLICATIONS

Information Disclosure Statement, U.S. Appl. No. 16/661,193, U.S. Pat. No. 11,079,773 B2 to Muhleman, p. 1 of 2.

Information Disclosure Statement, U.S. Appl. No. 16/661,193, U.S. Pat. No. 11,079,773 B2 to Muhleman, p. 2 of 2.

Aerostar, "Stratospheric Airships", <https://aerostar.com/products/balloons-airships/stratospheric-airships>.

Aerostar, "Super Pressure Balloons", <https://aerostar.com/products/balloons-airships/super-pressure-balloons>.

Aerostar, "Zero Pressure Balloons", <https://aerostar.com/products/balloons-airships/zero-pressure-balloons>.

Lewis, James Andrew, "Chinese Spy Balloons: The Sky's the Limit", <https://www.cis.org/analysis/chinese-spy-balloons-skys-limit>, CSIS, Feb. 3, 2023.

Flaten, James, "Techniques for Payload Stabilization for Improved Photography During Stratospheric Balloon Flights".

Aviation, "Could the US military have harnessed the Chinese observation balloon and accessed it without destroying it?" <https://aviation.stackexchange.com/questions/97499/>.

Aviation, "Is there any way to bring down a large spy balloon without force?" <https://aviation.stackexchange.com/questions/97521/is-there-any-way-to-bring-down-a-large . . . >.

Kube et al., "Chinese spy balloon gathered intelligence from sensitive U.S. military sites, despite U.S. efforts to block it", NBC News, Apr. 3, 2023.

Kube et al., "The secret U.S. effort to track, hide and surveil the Chinese spy balloon", <https://www.nbcnews.com/news/investigations/secret-US-effort . . . >, Dec. 22, 2023.

Boyd, Iain, "Analysis: How spy balloons work, and what information they can gather", The Conversation, republished by PBS, <https://www.pbs.org/newshour . . . >, Feb. 7, 2023.

Seligman et al., "Timeline: A Chinese spy balloon's trip across the United States" Politico, <https:www.politico.com/news/2023/02/05/ . . . >, Feb. 2, 2023.

Reddit, "How could a high-altitude surveillance balloon be captured?", <https://www.reddit.com/r/askscience/comments/10sr3w2/how_could_a_highaltitude_surveillance_balloon . . . >.

Wikipedia, "Remote controlled weapon station", <https://en.wickpedia.org/wiki/Remote_controlled_weapon_station>.

Saballa, Joe, "US Seeking New Tech to Capture, Not Kill, Enemy Spy Balloons", The Defense Post, <https://wwwthedefensepost.com/2023/08/11/us-capture-spy-balloons/>, Aug. 11, 2023.

* cited by examiner

LIGHTER-THAN-AIR VEHICLE INTERCEPTOR

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice: (619) 553-5118; email: NIWC_Pacific_T2@navy.mil. Reference Navy Case Number 211456.

BACKGROUND OF THE INVENTION

Field of the Invention

The present invention relates generally to lighter-than-air vehicles, e.g., balloons. More particularly, the present invention relates to lighter-than-air (LTA) vehicle interceptors.

Description of Related Art

As a type of LTA airship, unmanned balloons generally include a bulbous envelope filled with an LTA gas, e.g., helium or hydrogen, and a payload, generally suspended from below the envelope by cord, rope or cable. The payload may be anything that is useful at its intended altitude or range of flight. Weather balloons and stratospheric balloons are used commonly today to carry sensors to desired altitude with sensors for various measurements, recording and data transmission. The variety and intended use of unmanned balloons is quite diverse.

Balloons were used as an important tool for intelligence gathering in the nineteenth century. Since then, their usefulness for intelligence gathering has declined, especially since they can easily be shot down by a jet fighter plane or missile. Balloons are not ideal as a platform for spying because they tend to be big, hard to hide and they generally go where the winds take them. Nonetheless, sophisticated nation states continue to use spy balloons.

As first detected on Jan. 28, 2023, China floated a spy balloon over portions of the United States from Alaska to the East Coast, presumably gathering intelligence from several sensitive American military sites. China was able to control motion of the balloon so it could make multiple passes over some of the sites, at times flying figure-eight formations. The possibility that such intelligence data and information might be collected and transmitted back to China, raised serious security concerns for the United States. It is believed that the type of information gathered during the balloon's journey may have included electronic signals picked up from weapons systems or communications from base personnel as well as image and video data.

Regardless of the particular intelligence gathered and the value of that intelligence, the urgency to neutralize the Chinese spy balloon was balanced against capturing its payload safely and as intact as possible to analyze an adversary's intelligence gathering mechanism. During the Chinese balloon's travels over the US, the US military weighed various options to bring down the balloon safely, for analysis, but also to protect US territory from a heavy object (estimated payload weight exceeding 2000 lbs or 910 kg) falling from the sky.

Ultimately, on Feb. 4, 2023, once the balloon was safely over water, a US Air Force F-22 fighter jet flying at 58,000 ft of elevation was used to launch a single AIM-9X Sidewinder air-to-air missile to take down the balloon which was flying at an estimated altitude of 60,000 to 65,000 ft. The balloon's payload was recovered by US Navy divers in an estimated 47 ft depth of water about 6 nautical miles off of the US East Coast.

That particular incident with the Chinese spy balloon, and the possibility of others in the future, highlights the need for better ways of neutralizing or capturing such LTA vehicles that pose a threat to US national security. Additionally, the cost of scrambling an F-22 and expending an AIM-9X Sidewinder air-to-air missile (up to $400,000/unit cost depending on variation) provides an economic incentive to find better methods of neutralizing such threat balloons. Finally, it would be desirable to have a system for safely capturing (if possible) such threat balloons without relying on a 60,000 ft plunge to earth and digging the wreckage out of soil from an impact site, or from the bottom of a body of water. In view of the foregoing and for other reasons that will become evident, there exists a need in the art for improved LTA vehicle interception.

SUMMARY OF THE INVENTION

An embodiment of a lighter-than-air (LTA) vehicle interceptor for intercepting a non-cooperative LTA (NCLTA) vehicle and attached threat payload operating aerially above ground is disclosed. The embodiment of an LTA vehicle interceptor may include an airship vehicle platform capable of maneuvering to within an operable distance of the NCLTA vehicle and the attached threat payload; an interceptor payload attached to the airship vehicle platform, the interceptor payload further including a severing effector for engaging with the NCLTA vehicle and the threat payload and an on-board control subsystem for automated and/or remote control by an operator for controlling the interceptor payload and the severing effector. The embodiment of an LTA vehicle interceptor may further include a power subsystem for powering the interceptor payload and the severing effector; and wherein the airship vehicle platform and the severing effector cooperate to separate the NCLTA vehicle from the threat payload and return the threat payload to the ground for operator retrieval.

Another embodiment of an LTA vehicle interceptor for intercepting a NCLTA vehicle and attached threat payload operating aerially above ground is disclosed. The embodiment of an LTA vehicle interceptor may include an airship vehicle platform capable of maneuvering to within an operable distance of the NCLTA vehicle and the attached threat payload and an interceptor payload attached to the airship vehicle platform. The interceptor payload may further include a grasping effector for engaging the NCLTA vehicle and the threat payload and an on-board control subsystem for automated and/or remote control by an operator for controlling the interceptor payload and the severing effector. The embodiment of an LTA vehicle interceptor may further include a power subsystem for powering the interceptor payload and the severing effector and wherein the airship vehicle platform and the grasping effector cooperate to clamp onto the NCLTA vehicle or the threat payload and return the threat payload to the ground for operator retrieval.

Still another embodiment of an LTA vehicle interceptor for intercepting a NCLTA vehicle and attached threat payload operating aerially above ground is disclosed. This embodiment of an LTA vehicle interceptor may include an airship vehicle platform capable of maneuvering to within an operable distance of the NCLTA vehicle and the attached threat payload. This embodiment of an LTA vehicle interceptor may further include an interceptor payload attached to the airship vehicle platform, the interceptor payload including a puncturing effector for engaging the NCLTA vehicle and the threat payload and an on-board control subsystem for automated and/or remote control by an operator for controlling the interceptor payload and the severing effector. This embodiment of an LTA vehicle interceptor may further include a power subsystem for powering the interceptor payload and the severing effector. According to this embodiment of an LTA vehicle interceptor, the airship vehicle platform and the puncturing effector may cooperate to reduce buoyancy of the NCLTA vehicle and the threat payload and return the threat payload to the ground for operator retrieval.

An embodiment of a method for intercepting a NCLTA vehicle including an envelope configured for up to stratospheric buoyancy and a threat payload suspended from the envelope by rigging is disclosed. The method embodiment may include providing an LTA vehicle interceptor configured for intercepting the NCLTA vehicle and the threat payload operating aerially above ground, the LTA vehicle interceptor further configured with a plurality of effectors for engaging the NCLTA vehicle and/or the threat payload; deploying the LTA vehicle interceptor from a location below the NCLTA; navigating the LTA vehicle interceptor to within an operational distance away from the NCLTA; engaging the NCLTA vehicle and/or the threat payload with at least one of the plurality of effectors to disable the NCLTA vehicle; securing the threat payload to the LTA vehicle interceptor; and returning the threat payload safely to the ground.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment but may be expanded for use with any of the other methods, apparatuses and systems described herein as will be understood by one of ordinary skill in the art unless specifically otherwise stated.

LTA vehicles from an adversarial country with military or intelligence, surveillance, and reconnaissance (ISR) payloads may fly over a country as occurred with the Chinese spy balloon that entered the continental United States over Montana, traversed the United States, and was shot down over coastal waters off of South Carolina. The "balloon" and its payload then fell precipitously to the ocean. The uncontrolled nature of this fall was noted as a reason not to shoot down the threat balloon over Montana. There is a need for a better solution to this technical problem. The technical solution should be: (1) more efficient than sending a fighter jet and using a roughly $400 k missile, (2) ideally, allow for the adversarial system (or portions thereof) to be brought to earth more safely, and (3) ideally, allow the adversarial system to be captured intact for further inspection.

The technical problem addressed by the present invention is a method and system for neutralizing and safely capturing, if possible, a non-cooperative LTA airship, e.g., a spy balloon. While the embodiments of the invention disclosed herein are described with reference to a non-cooperative stratospheric balloon airship with an envelope carrying a threat payload suspended underneath the envelope via cords or other suspension means (rigging), it will be understood that other types of non-cooperative LTA airships, e.g., dirigibles or drones, may also be intercepted according to particular embodiments of the present invention. Particular embodiments of the technical solution (invention) are described below.

Figure 1:
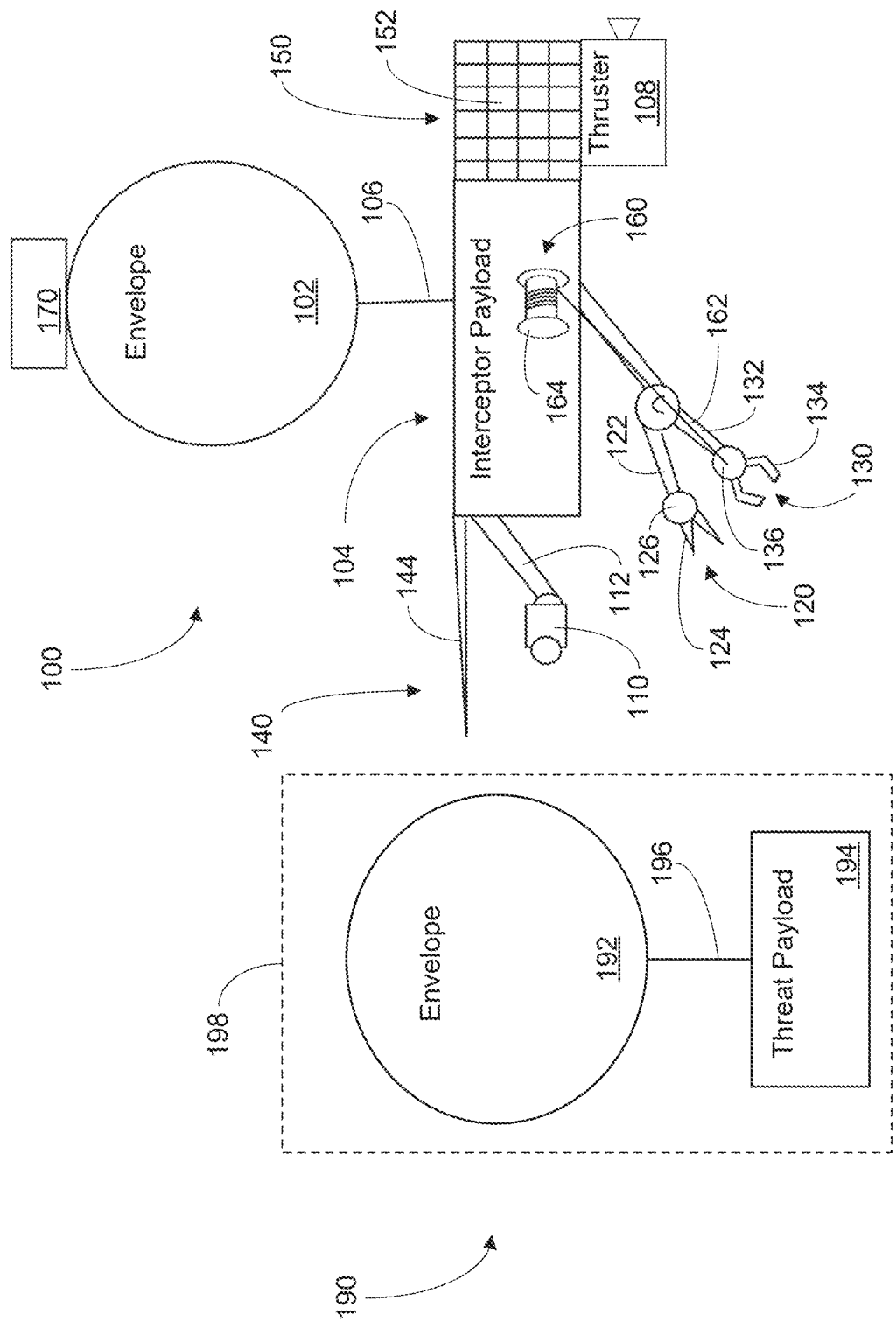
FIG. 1 is a diagram illustrating an embodiment of an LTA vehicle interceptor, according to the present invention.

FIG. 1 is a diagram illustrating an embodiment of an LTA vehicle interceptor 100 in the air and near a NCLTA vehicle 190, according to the present invention. It will be understood that FIG. 1 is diagrammatic only, not drawn to scale and is used to illustrate multiple embodiments of the invention in a single diagram for simplicity. The NCLTA vehicle 190 is depicted as a stratospheric balloon with an envelope 192 and a threat payload 194 suspended below the envelope 192 by rigging 196. It will be understood that rigging 196 may be cord, rope, cable or netting used to secure the threat payload 194 below the envelope 192 that provides buoyancy to NCLTA vehicle 190. It will be further understood that NCLTA vehicle 190 may be another type of LTA vehicle, such as a dirigible. But, for the exemplary embodiments of the invention shown in FIG. 1, the NCLTA vehicle 190 is a balloon, as shown. Embodiments of the LTA vehicle interceptor 100 described herein are unmanned and remotely controlled by an operator.

As further illustrated in FIG. 1, the LTA vehicle interceptor 100 may also include an envelope 102 supporting an interceptor payload 104 via rigging 106. It will be understood that the particulars of the envelope 102 and rigging 106 are not critical to the inventive concepts of the present invention. The envelope 102 and rigging 106 need only be sufficient to lift and support the interceptor payload 104 to an appropriate altitude to engage with the NCLTA vehicle 190 and safely return the threat payload 194. It will be understood that any suitable commercial or military grade airship may be used with the interceptor payload 104 of the present invention. For example, and not by way of limitation, the "Thunderhead Balloon Systems", "Super Pressure Balloons", and "Zero Pressure Balloons", available from Aerostar, 3901 W 59th St, Sioux Falls, SD 57108, are all suitable airships from which the inventive interceptor payload 104 might be deployed to engage a NCLTA vehicle 190, consistent with the teachings of the present invention.

As shown in FIG. 1, the interceptor payload 104 may be configured with one or more propulsion means, or thrusters 108 for adjusting lateral position of the LTA vehicle interceptor 100 to within a suitable operational distance, depicted as dashed box 198 around the NCLTA vehicle 190. It will be understood that the maneuverability or station keeping of the LTA vehicle interceptor 100 is context dependent. At moderate altitudes, the use of propellers as the propulsion technology may be sufficient. At stratospheric altitudes, the air gets so thin that propellers have nothing to push and so maneuvering and even station keeping is generally performed by adjusting the buoyancy of the balloon/airship to get to an altitude where the prevailing wind direction will be helpful to get to where you want to go (laterally) and then the altitude adjusted as needed if a different altitude is desired. For some lateral maneuverability one could potentially use thrusters 108 like those used on satellites to get more speed and to orient effectors and other sensors for operational engagement. It will be understood that one of ordinary skill in the art will be familiar with LTA airship propulsion technologies and how to incorporate same in an interceptor payload 104. Accordingly, no further description of such propulsion technologies that might be included in thrusters 108 is provided herein.

As shown in FIG. 1, the interceptor payload 104 may also be configured with one or more imaging devices 110 (one shown in FIG. 1) attached to a pointing apparatus 112. According to one embodiment, the imaging device 110 may be capable of focusing on the NCLTA vehicle 190 and its attached threat payload 194. The one or more imaging devices 110 may record and transmit video and still image data for use by the operator. According to another embodiment, the imaging device 110 may have a sensor for imaging outside of the visible spectrum, e.g., infra-red, or other wavelengths of radiation that may be of interest for a particular NCLTA vehicle 190. Embodiments of a pointing apparatus 112 may include an articulating arm, a telescoping arm, or both with rotational capability, holding an imaging device 110 at a distal end that is capable of being oriented in the direction of the NCLTA vehicle 190 and/or its threat payload 194 in order to facilitate focusing of imaging data performed by the one or more imaging devices 110. It will be understood that any suitable imaging device 110 may be employed with the interceptor payload 104. According to another embodiment, imaging device(s) 110 may be all or partly off-board from the interceptor payload 104, e.g., ground-based radar (not shown). It will be further understood that one of ordinary skill in the art will have sufficient knowledge to implement an imaging device 110 and/or pointing apparatus 112 consistent with the teachings of the present invention, and thus will not be further elaborated herein.

Severing Effector

According to a particular embodiment, an LTA vehicle interceptor 100 may include a severing effector, shown at arrow 120, mounted to, and directly controlled by, the interceptor payload 104, in turn under operator control. The severing effector 120 may be configured to physically engage and damage vulnerable structure of the NCLTA vehicle 190, such as the cord on the rigging 196 or the envelope 192. Thus, the severing effector 120 may be used to decrease buoyancy of the NCLTA vehicle 190 by opening a hole in the envelope 192 in a coordinated effort to bring the NCLTA vehicle 190 to ground. Alternatively, the severing effector 120 may be used to separate the envelope 192 from the threat payload 194. The severing effector 120 may be configured with one or more cutting elements 124, e.g., scissors, sheers, bolt cutters, reciprocating or rotating blades, chainsaws, etc., mounted to a distal end 126 of a severing arm 122, directly controlled by the interceptor payload 104 under operator control. Each type of cutting element 124 may be configured for severing particular structural features of the NCLTA vehicle 190.

Embodiments of severing arm 122 may be robotic, and capable of telescoping outward from the interceptor payload 104, using electric motors (not shown) as well as configured to rotate about various axes in order to place the cutting element in position to damage to the NCLTA vehicle 190 once within the operational distance 198 around the NCLTA vehicle 190. It will be understood that control of the severing effector 120 may be facilitated by visual feedback from an imaging device 110 under operator control, according to one embodiment, or automated to target particular structural elements of the NCLTA vehicle 190 via sensors, according to other embodiments. According to yet another embodiment, the severing effector 120 may be equipped with its own imaging device and targeting mechanism to quickly identify and sever target rigging 196, envelope 192 or even structural elements of the threat payload 194 itself. It will be understood that suitable types of cutting elements 124 attached to movable severing arms 122 and their control are within the knowledge of one of ordinary skill in the art given this disclosure. Accordingly, further detail regarding same will not be elaborated herein.

Grasping Effector

According to another embodiment, an LTA vehicle interceptor 100 may include a grasping effector, shown at arrow 130, mounted to, and directly controlled by, the interceptor payload 104, in turn under operator control. The grasping effector 130 may be configured with one or more grasping elements 134 such as a clamp, grappling hook, collapsible net, harpoon, etc., according to various embodiments of the present invention. It will be understood that one of ordinary skill in the art will be familiar with the workings and how to implement such exemplary grasping elements 134 according to the teachings of the present invention, and thus will not be further elaborated herein. Embodiments of grasping elements may be disposed about the distal end 136 of a grasping arm 132. The grasping effector 130 may be configured to physically engage and hold onto the structure of the NCLTA vehicle 190, such as the threat payload 194, cord on the rigging 196 or a portion of the envelope 192. In this way, the grasping effector 130 may be capable of grabbing the NCLTA vehicle 190 and reducing buoyancy in combination with LTA vehicle interceptor 100 reducing its buoyancy, i.e., the LTA vehicle interceptor 100 may simply drag the NCLTA vehicle 190 and its threat payload 194 to the ground.

Embodiments of grasping arm 132 may be robotic, and capable of telescoping outward from the interceptor payload 104, using electric motors (not shown), as well as configured to rotate about various axes in order to place the grasping element 134 in position to grasp some structural feature of the NCLTA vehicle 190 once within the operational distance 198 around the NCLTA vehicle 190. It will be understood that control of the grasping effector 130 may be facilitated by visual feedback from an imaging device 110 under operator control, according to one embodiment, or automated to target particular structural elements of the NCLTA vehicle 190 via sensors, according to other embodiments. According to another embodiment, the grasping effector 130 may be equipped with its own imaging device and targeting mechanism (neither shown) to quickly identify target rigging 196, envelope 192 or even structural elements of the threat payload 194 itself for grasping. It will be understood that suitable types of grasping elements 134 attached to movable grasping arms 132 and their control are within the knowledge of one of ordinary skill in the art given this disclosure. Accordingly, further detail regarding same will not be elaborated herein.

According to a particular embodiment of LTA vehicle interceptor 100, a severing effector 120 may be used in combination with a grasping effector 130. For example, safely securing the threat payload 194 may be achieved by first grabbing onto threat payload 194 structure with the grasping effector 130, then severing cords from rigging 196, or puncturing the envelope 192 using the severing effector 120, followed by gently descending to ground with the threat payload 194 under LTA vehicle interceptor 100 control, with or without envelope 192. In this way, the NCLTA vehicle 190 is neutralized and the threat payload 194 secured for further analysis.

Puncturing Effector

According to yet another embodiment, an LTA vehicle interceptor 100 may include a puncturing effector 140 mounted to, and directly controlled by, the interceptor payload 104, in turn under operator control. The puncturing effector 140 may be configured with one or more puncturing elements 144, for example and not by way of limitation, a blade or knife, a needle, a spear, an arrow, a bolt, a ballistic projectile from a gun, etc. Puncturing effector 140 may be configured to reduce buoyancy of the NCLTA vehicle 190 reducing the integrity of envelope 192 by puncturing or tearing one or more holes in envelope 192. Depending on the particular embodiment, puncturing element 144, may be a single use, or reloadable, expendable item, such as an arrow, a bolt or a cartridge from a gun that is aimed at the envelope 192 for the purpose of creating a hole in the envelope 192. Other embodiments of the puncturing element 144 may remain connected to payload 104 and be mounted to a robotic puncturing arm (not shown, but see 122 and 132) capable of telescoping outward from the interceptor payload 104, using electric motors (not shown), as well as configured to rotate about various axes in order to place the puncturing element 144 in position to puncture the envelope 192 of the NCLTA vehicle 190 once within the operational distance 198 around the NCLTA vehicle 190. For simplicity of illustration in FIG. 1, puncturing effector 140 is simply illustrated as a needle extending from the interceptor payload 104. One of ordinary skill in the art will be familiar with how to employ puncturing elements whether directly mounted to the interceptor payload 104 or at the distal end of a robotic puncturing arm given the disclosure herein. Accordingly, further detail regarding same will not be elaborated herein.

According to a particular embodiment of LTA vehicle interceptor 100, a puncturing effector 140 may be used in combination with a grasping effector 130. For example, and not by way of limitation, safely securing the threat payload 194 may be achieved by first grabbing onto threat payload 194 structure with the grasping effector 130. Once the threat payload is secured by the grasping effector 130, the puncturing effector 140 may then be used to open a hole in the envelope 192. This will reduce the buoyancy of the NCLTA vehicle 190, allowing the LTA vehicle interceptor 100 to gently descend to ground with the threat payload 194 under LTA vehicle interceptor 100 buoyancy and control. In this way, the NCLTA vehicle 190 is neutralized and the threat payload 194 secured for further analysis.

FIG. 1 further illustrates a weight-bearing apparatus 160 for use with one or more of the effectors 120, 130, 140 described herein. More particularly, FIG. 1 illustrates a particular weight-bearing apparatus 160, namely a cable 162 and winch 164 that may be configured with one end of the cable attached to a particular effector, in this instance a grasping element 134 such as a clamp. Once the grasping element 134 is secured to the threat payload 194 it could be detached from grasping arm 132 and fully supported from the interceptor payload 104 chassis via winch 164. By using the weight-bearing apparatus 160, the grasping arm 132 need not support the entire tethered weight of the threat payload 194 and/or the entire NCLTA vehicle 190. Additionally, the winch 164 may be used to selectively raise or lower the NCLTA vehicle 190 and/or threat payload 194 relative to the LTA vehicle interceptor 100.

While the weight-bearing apparatus 160 is shown in cooperation with the grasping effector 130, it will be understood that it could also be configured for cooperation with other effector elements described herein, such as a harpoon, grappling hook, net, arrow, bolt, etc., that could secure one end of the cable 162 to the NCLTA vehicle 190 or threat payload 194 and then be tethered to the LTA vehicle interceptor 100 via winch 164 wrapped with the cable 162.

As shown in FIG. 1, the interceptor payload 104 may also be configured with a power subsystem, shown generally at arrow 150, for powering interceptor payload 104 and each of its effectors 120, 130, 140 described herein. The power subsystem 150 may include one or more batteries (not shown in FIG. 1), one or more solar panels 152 for passive charging of the batteries and a power controller (not shown) for managing batteries and solar panels.

While the interceptor payload 104 illustrated in FIG. 1 is shown hanging from envelope 102 via rigging 106, another configuration has also been contemplated and illustrated. FIG. 1 further illustrates a top-mounted interceptor payload 170. It will be understood that structural rigging (not shown) would be required for an embodiment of a top-mounted payload 170. Top-mounted interceptor payload 170 may include any of the features described herein with respect to interceptor payload 104, but rather located above envelope 102. Top-mounted interceptor payload 170 may be particularly advantageous for engaging the threat payload 194 from underneath the NCLTA vehicle 190 and without necessarily first engaging envelope 192. Additionally, accessing the threat payload 194 from underneath may be advantageous if the size of the envelope 192 of the NCLTA vehicle 190 makes it difficult to approach because of its size and how it might impede access to the threat payload 194. According to one embodiment of top-mounted interceptor payload 170, a grasping effector 130 may be used to secure attachment to the threat payload 194 from underneath the threat payload 194 and in coordination with a weight-bearing apparatus 160, LTA vehicle interceptor may simply drag the entire NCLTA vehicle 190 safely to ground. Thus, rather than puncturing or deflating the envelope 192 of NCLTA vehicle 190, the LTA vehicle interceptor 100 could attach to the NCLTA vehicle 190 and then decrease its own (interceptor's) buoyancy so as to bring them both down to earth. Depending on the relative buoyancies and payload weights involved, this may require added weight/ballast for the LTA vehicle interceptor 100 (i.e., its own deflated weight has to be enough when added to the NCLTA vehicle 190 to exceed the lift of the threat envelope 192).

Figure 2:
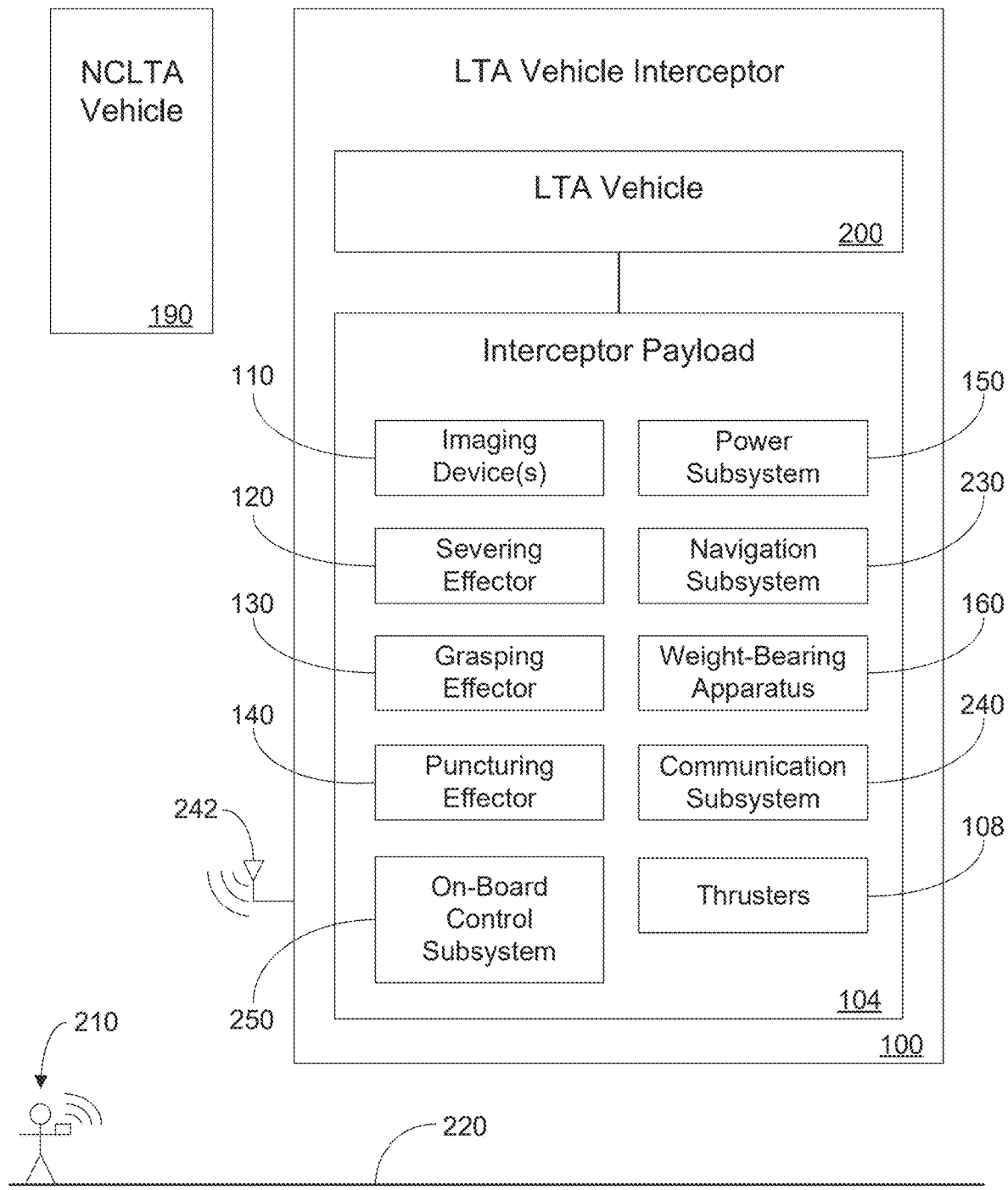
FIG. 2 is a schematic block diagram illustrating an LTA vehicle interceptor, NCLTA vehicle and operator, according to the present invention.

FIG. 2 is a schematic block diagram illustrating an LTA vehicle interceptor 100, NCLTA vehicle 190 and operator 210, according to the present invention. More particularly, FIG. 2 illustrates an operator 210 wirelessly in communication with the LTA vehicle interceptor 100 from the ground 220. Both the NCLTA vehicle 190 and the LTA vehicle interceptor 100 may be located anywhere above ground 220, perhaps at stratospheric elevations. The LTA vehicle interceptor 100 may include an LTA vehicle 200 such as the balloons or dirigibles described herein. The LTA vehicle interceptor 100 may further include rigging 106 for attaching interceptor payload 104 to the LTA vehicle 200 below or above (see interceptor payload 174, FIG. 1), as described herein.

As shown in FIG. 2, the interceptor payload 104 may include a number of subsystems, for example, imaging device(s) 110, a power subsystem 150, a severing effector 120, a navigation subsystem 230, a grasping effector 130, a weight-bearing apparatus 160, a puncturing effector 140, a communications subsystem 240 with associated antenna 242, one or more thrusters 108 and an on-board control subsystem 250. Again, it will be understood that "thrusters 108" as used herein could be any suitable propulsion technology and one of ordinary skill in the art will be equipped with sufficient knowledge to implement such propulsion technology for use as described in this disclosure. The on-board control subsystem 250 may be configured to provide operator 210, remote control, or automated control of the interceptor payload 104 and its interactions with the NCLTA vehicle 190.

Embodiments of the navigation subsystem 230 may include one or more global positioning system (GPS) units, one or more inertial navigation units (INUs), compasses or other suitable means for establishing the location of the LTA vehicle interceptor 100 which may be used in combination with the on-board control subsystem 250 to navigate to the NCLTA vehicle 190 for operational engagement and away from such engagement to return the threat payload 194 (FIG. 1) to ground 220. The use and implementation of such navigational features will be within the knowledge of one of ordinary skill in the art given this disclosure. Accordingly, further detail regarding same will not be elaborated herein.

Embodiments of the communication subsystem 240 with its associated antenna 242 may include any suitable wireless communications suitable for an operator 210 to use and control the interceptor payload 104, 170 (see FIG. 1) remotely away from LTA vehicle interceptor 100, e.g., from the ground 220 or any suitable location. Depending on the particular embodiment, an operator 210 may have remote control of the interceptor payload 104 including video data from the imaging device(s) 110 or other pointing/aiming mechanisms used to guide effectors 120, 130, 140 for their intended purposes in engaging the NCLTA vehicle 190. FIG. 2 illustrates a single operator 210 controlling the interceptor payload 104. However, it will be understood that a team of operators 210 may be employed to operate various aspects of the interceptor payload 104 and/or the LTA vehicle 200 to the extent it also has remote controls.

Embodiments of the on-board control subsystem 250 may include one or more processors in communication with one or more memory subsystems for storing data and executable computer program instructions for implementing control of the interceptor payload 104. Embodiments of the on-board control subsystem 250 may be in communication with, and in control of, all of the other interceptor payload 104 subsystems, including imaging devices 110, severing effectors 120, grasping effectors 130, puncturing effectors 140, power subsystem 150, navigation subsystem 230, weight-bearing apparatus 160, communication subsystem 240, and thrusters 108. However, it will be understood that according to other embodiments, some subsystems within the interceptor payload 104 may operate autonomously. For example, and not by way of limitation, the power subsystem 150 may automatically generate and deliver power to other electrically powered subsystems on the interceptor payload 104 without intervention from the on-board control subsystem 250.

Though not illustrated in FIGS. 1 and 2, another embodiment of the LTA vehicle interceptor 100 may be configured with intelligence, surveillance and reconnaissance (ISR) payloads configured to characterize NCLTA vehicle 190 before intercepting it (which could drive the decision whether or not to intercept). According to another embodiment, also not illustrated in FIGS. 1 and 2, yet another embodiment of the LTA vehicle interceptor 100 may also be configured with electronic warfare payloads to interfere with NCLTA vehicle 190 functionalities, e.g., data transmission, navigation jamming, etc.

Figure 3:
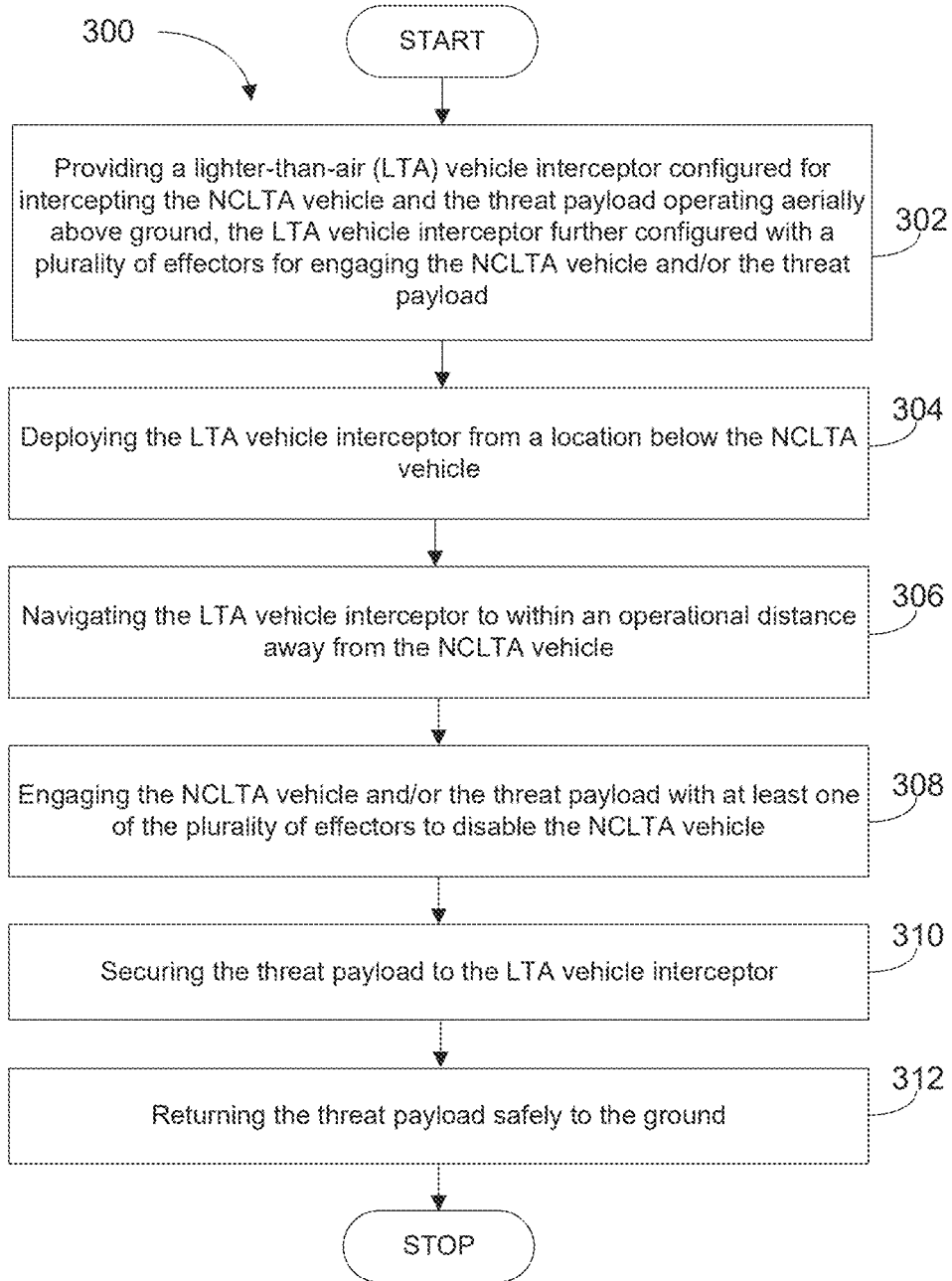
FIG. 3 is a flowchart of a method for intercepting a NCLTA vehicle including an envelope configured for up to stratospheric buoyancy and a threat payload suspended from the envelope by rigging, according to the present invention.

FIG. 3 is a flowchart of a method 300 for intercepting a NCLTA vehicle including an envelope configured for up to stratospheric buoyancy and a threat payload suspended from the envelope by rigging, according to the present invention. The embodiment of method 300 may include providing 302 an LTA vehicle interceptor configured for intercepting the NCLTA vehicle and the threat payload operating aerially above ground, the LTA vehicle interceptor further configured with a plurality of effectors for engaging the NCLTA vehicle and/or the threat payload. The embodiment of method 300 may further include deploying 304 the LTA vehicle interceptor from a location below the NCLTA vehicle. The embodiment of method 300 may further include navigating 306 the LTA vehicle interceptor to within an operational distance away from the NCLTA vehicle. The embodiment of method 300 may further include engaging 308 the NCLTA vehicle and/or the threat payload with at least one of the plurality of effectors to disable the NCLTA vehicle. The embodiment of method 300 may further include securing 310 the threat payload to the LTA vehicle interceptor. The embodiment of method 300 may further include returning 312 the threat payload safely to the ground. According to another embodiment of method 300, the plurality of effectors includes at least one each of the following effectors: a severing effector, a grasping effector and a puncturing effector.

Having described specific embodiments of an LTA vehicle interceptor 100 and method 300 for intercepting a NCLTA vehicle 190 using an LTA vehicle interceptor 100 with reference to the drawing FIGS. 1, 2 and 3, additional general embodiments of an LTA vehicle interceptor according to the present invention are described, below.

An embodiment of an LTA vehicle interceptor for intercepting a NCLTA vehicle and attached threat payload operating aerially above ground is disclosed. The embodiment of an LTA vehicle interceptor may include an airship vehicle platform capable of maneuvering to within an operable distance of the NCLTA vehicle and the attached threat payload. The embodiment of an LTA vehicle interceptor may further include an interceptor payload attached to the airship vehicle platform. According to this embodiment of an LTA vehicle interceptor, the interceptor payload may further include a severing effector for engaging with the NCLTA vehicle and the threat payload. According to this embodiment of an LTA vehicle interceptor, the interceptor payload may further include an on-board control subsystem for automated and/or remote control by an operator for controlling the interceptor payload and the severing effector. According to this embodiment of an LTA vehicle interceptor, the interceptor payload may further include a power subsystem for powering the interceptor payload and the severing effector. According to this embodiment of an LTA vehicle interceptor, the airship vehicle platform and the severing effector may be configured to cooperate to separate the NCLTA vehicle from the threat payload and return the threat payload to the ground for operator retrieval.

According to another embodiment of an LTA vehicle interceptor, the airship vehicle platform may be a balloon, a dirigible, or a drone. According to yet another embodiment of an LTA vehicle interceptor, the airship vehicle platform may also be controlled by the operator.

According to one embodiment of the LTA vehicle interceptor, the interceptor payload may further include a navigation subsystem for sensing and providing location data for the LTA vehicle interceptor. According to this embodiment of the LTA vehicle interceptor, the interceptor payload may further include at least one imaging device for gathering and providing imaging data of the NCLTA vehicle. According to this embodiment of the LTA vehicle interceptor, the interceptor payload may further include a communications subsystem for transmitting the location data and the imaging data to the operator. According to this embodiment of the LTA vehicle interceptor, the interceptor payload may further include an on-board control subsystem in communication with, and for controlling, the navigation system, the at least one imaging device and the communications subsystem under operator control.

According to another embodiment of the LTA vehicle interceptor, the power subsystem may include at least one battery and optionally a solar panel operably coupled to the at least one battery. According to other embodiments of the LTA vehicle interceptor, the severing effector may be scissors, sheers, or bolt cutter. According to a particular embodiment of the LTA vehicle interceptor, the severing effector may be connected to a distal end of a movable arm secured to the interceptor payload by a proximal end of the movable arm. According to this embodiment, the severing effector may be movable in any direction under operator control.

An embodiment of an LTA vehicle interceptor for intercepting a NCLTA vehicle and attached threat payload operating aerially above ground is disclosed. The embodiment of an LTA vehicle interceptor may include an airship vehicle platform capable of maneuvering to within an operable distance of the NCLTA vehicle and the attached threat payload. The embodiment of an LTA vehicle interceptor may further include an interceptor payload attached to the airship vehicle platform. Embodiments of the interceptor payload may further include a grasping effector for engaging the NCLTA vehicle and/or the threat payload. Embodiments of the interceptor payload may further include an on-board control subsystem for automated and/or remote control by an operator for controlling the interceptor payload and the severing effector. Embodiments of the interceptor payload may further include a power subsystem for powering the interceptor payload and the severing effector. According to this embodiment of an LTA vehicle interceptor, the airship vehicle platform and grasping effector may cooperate to clamp onto the NCLTA vehicle or the threat payload and return the threat payload to the ground for operator retrieval.

According to another embodiment of the LTA vehicle interceptor, the airship vehicle platform may be a balloon, a dirigible, or a drone. According to yet another embodiment of the LTA vehicle interceptor, the airship vehicle platform may also be remotely controlled by the operator. According to still another embodiment of the LTA vehicle interceptor, the interceptor payload may further include a navigation subsystem for sensing and providing location data for the LTA vehicle interceptor. According to this embodiment of the LTA vehicle interceptor, the interceptor payload may further include at least one imaging device for gathering and providing imaging data of the NCLTA vehicle. According to this embodiment of the LTA vehicle interceptor, the interceptor payload may further include a communications subsystem for transmitting the location data and the imaging data to the operator. According to this embodiment of the LTA vehicle interceptor, the interceptor payload may further include an on-board control subsystem in communication with, and for controlling, the navigation subsystem, the at least one imaging device and the communications subsystem under operator control.

According to one embodiment of an LTA vehicle interceptor, the power subsystem may further include at least one battery and optionally a solar panel operably coupled to the at least one battery. According to other embodiments of an LTA vehicle interceptor, the grasping effector may be a clamp, a grappling hook or a net. According to yet another embodiment of an LTA vehicle interceptor, the grasping effector may be connected to a distal end of a movable arm secured to the interceptor payload by a proximal end of the movable arm and the grasping effector may be movable in any direction under operator control. According to still another embodiment of an LTA vehicle interceptor, the interceptor payload and the grasping effector may be located at the top of the airship vehicle platform to facilitate grasping the NCLTA vehicle or the threat payload from underneath the NCLTA vehicle or the threat payload.

Still another embodiment of an LTA vehicle interceptor for intercepting a NCLTA vehicle and attached threat payload operating aerially above ground is disclosed. The embodiment of an LTA vehicle interceptor may include an airship vehicle platform capable of maneuvering to within an operable distance of the NCLTA vehicle and the attached threat payload. The embodiment of an LTA vehicle interceptor may further include an interceptor payload attached to the airship vehicle platform. According to this embodiment of an LTA vehicle interceptor, the interceptor payload may further include a puncturing effector for engaging the NCLTA vehicle and the threat payload. According to this embodiment of an LTA vehicle interceptor, the interceptor payload may further include an on-board control subsystem for automated and/or remote control by an operator for controlling the interceptor payload and the severing effector. According to this embodiment of an LTA vehicle interceptor, the interceptor payload may further include a power subsystem for powering the interceptor payload and the severing effector. According to this embodiment of an LTA vehicle interceptor, the airship vehicle platform and the puncturing effector cooperate to reduce buoyancy of the NCLTA vehicle and the threat payload and return the threat payload to the ground for operator retrieval.

According to particular embodiments of the LTA vehicle interceptor, the airship vehicle platform may be a balloon, a dirigible, or a drone. According to one embodiment of the LTA vehicle interceptor, the airship vehicle platform may also be controlled by the operator. According yet another embodiment of an LTA vehicle interceptor, the interceptor payload may further include a navigation subsystem for sensing and providing location data for the LTA vehicle interceptor. According to this embodiment of an LTA vehicle interceptor, the interceptor payload may further include at least one imaging device for gathering and providing imaging data of the NCLTA vehicle. According to this embodiment of an LTA vehicle interceptor, the interceptor payload may further include a communications subsystem for transmitting the location data and the imaging data to the operator. According to this embodiment of an LTA vehicle interceptor, the interceptor payload may further include an on-board control subsystem in communication with, and for controlling, the navigation subsystem, the at least one imaging device and the communications subsystem under operator control.

According to another embodiment of this LTA vehicle interceptor, the power subsystem may further include at least one battery and optionally a solar panel operably coupled to the at least one battery. According to yet another embodiment of this LTA vehicle interceptor, the puncturing effector may be any one of the following: a knife, a needle, a spear, an arrow, or a bolt. According to still another embodiment of this LTA vehicle interceptor, the puncturing effector may be connected to a distal end of a movable arm secured to the interceptor payload by a proximal end of the movable arm and the puncturing effector may be movable in any direction under operator control.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

From the above description of the embodiments of an LTA vehicle interceptor 100 and method 300, it is manifest that various alternative structures may be used for implementing features of the present invention without departing from the scope of the claims. The described embodiments are to be considered in all respects as illustrative and not restrictive. It will further be understood that the present invention may suitably comprise, consist of, or consist essentially of the component parts, method steps and limitations disclosed herein. The method and/or apparatus disclosed herein may be practiced in the absence of any element that is not specifically claimed and/or disclosed herein.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A lighter-than-air (LTA) vehicle interceptor for intercepting a non-cooperative LTA (NCLTA) vehicle having attached threat payload configured to operate aerially above ground, the LTA vehicle interceptor comprising:
    an airship vehicle platform capable of maneuvering to within an operable distance of the NCLTA vehicle having the attached threat payload;
    an interceptor payload attached to the airship vehicle platform, the interceptor payload further comprising:
        a severing effector for engaging with the NCLTA vehicle and the threat payload; and
        an on-board control subsystem for automated and/or remote control by an operator for controlling the interceptor payload and the severing effector;
    a power subsystem for powering the interceptor payload and the severing effector; and
    wherein the onboard control subsystem and the severing effector are configured to cooperate to separate the NCLTA vehicle from the threat payload and return the threat payload to the ground for operator retrieval.

2. The LTA vehicle interceptor of claim 1, wherein the airship vehicle platform is selected from the group consisting of: a balloon, a dirigible, and an uncrewed aerial vehicle.

3. The LTA vehicle interceptor of claim 1, wherein the airship vehicle platform is also configured to be controlled by the operator.

4. The LTA vehicle interceptor of claim 1, wherein the interceptor payload further comprises:
    a navigation subsystem configured for sensing and providing location data for the LTA vehicle interceptor;
    at least one imaging device configured for gathering and providing imaging data of the NCLTA vehicle;
    a communications subsystem configured for transmitting the location data and the imaging data to the operator; and
    an on-board control subsystem in communication with, and configured for controlling, the navigation subsystem, the at least one imaging device and the communications subsystem under operator control.

5. The LTA vehicle interceptor of claim 1, wherein the power subsystem further comprises at least one battery and optionally a solar panel operably coupled to the at least one battery.

6. The LTA vehicle interceptor of claim 1, wherein the severing effector is selected from the group consisting of: scissors, sheers and bolt cutter.

7. The LTA vehicle interceptor of claim 1, wherein the severing effector is connected to a distal end of a movable arm secured to the interceptor payload by a proximal end of the movable arm, the severing effector movable in any direction under operator control.

8. A lighter-than-air (LTA) vehicle interceptor for intercepting a non-cooperative LTA (NCLTA) vehicle having attached threat payload configured to operate aerially above ground, the LTA vehicle interceptor comprising:
    an airship vehicle platform capable of maneuvering to within an operable distance of the NCLTA vehicle and the attached threat payload;
    an interceptor payload attached to the airship vehicle platform, the interceptor payload further comprising:
        a grasping effector configured for engaging the NCLTA vehicle and the threat payload; and
        an on-board control subsystem configured for automated and/or remote control by an operator for controlling the interceptor payload and the grasping effector;
    a power subsystem for powering the interceptor payload and the grasping effector; and
    wherein the onboard control subsystem and the grasping effector cooperate to clamp onto the NCLTA vehicle or the threat payload and return the threat payload to the ground for operator retrieval.

9. The LTA vehicle interceptor of claim 8, wherein the airship vehicle platform is selected from the group consisting of: a balloon, a dirigible, and an uncrewed aerial vehicle.

10. The LTA vehicle interceptor of claim 8, wherein the airship vehicle platform is also configured to be controlled by the operator.

11. The LTA vehicle interceptor of claim 8, wherein the interceptor payload further comprises:
    a navigation subsystem configured for sensing and providing location data for the LTA vehicle interceptor;
    at least one imaging device configured for gathering and providing imaging data of the NCLTA vehicle;

a communications subsystem configured for transmitting the location data and the imaging data to the operator; and an on-board control subsystem in communication with, and configured for controlling, the navigation subsystem, the at least one imaging device and the communications subsystem under operator control.

12. The LTA vehicle interceptor of claim 8, wherein the power subsystem further comprises at least one battery and optionally a solar panel operably coupled to the at least one battery.

13. The LTA vehicle interceptor of claim 8, wherein the grasping effector is selected from the group consisting of: clamp, grappling hook and net.

14. The LTA vehicle interceptor of claim 8, wherein the grasping effector is connected to a distal end of a movable arm secured to the interceptor payload by a proximal end of the movable arm, the grasping effector movable in any direction under operator control.

15. The LTA vehicle interceptor of claim 8, wherein the interceptor payload and the grasping effector is located at the top of the airship vehicle platform to facilitate grasping the NCLTA vehicle or the threat payload from underneath the NCLTA vehicle or the threat payload.

16. A lighter-than-air (LTA) vehicle interceptor for intercepting a non-cooperative LTA (NCLTA) vehicle having attached threat payload configured to operate aerially above ground, the LTA vehicle interceptor comprising:
  an airship vehicle platform capable of maneuvering to within an operable distance of the NCLTA vehicle and the attached threat payload;
  an interceptor payload attached to the airship vehicle platform, the interceptor payload further comprising:
    a puncturing effector configured for engaging the NCLTA vehicle and the threat payload; and
    an on-board control subsystem configured for automated and/or remote control by an operator for controlling the interceptor payload and the puncturing effector;
  a power subsystem configured for powering the interceptor payload and the puncturing effector; and
  wherein the on-board control subsystem and the puncturing effector are configured to cooperate to reduce buoyancy of the NCLTA vehicle and the threat payload and return the threat payload to the ground for operator retrieval.

17. The LTA vehicle interceptor of claim 16, wherein the airship vehicle platform is selected from the group consisting of: a balloon, a dirigible, and an uncrewed aerial vehicle.

18. The LTA vehicle interceptor of claim 16, wherein the airship vehicle platform is also configured to be controlled by the operator.

19. The LTA vehicle interceptor of claim 16, wherein the interceptor payload further comprises:
  a navigation subsystem configured for sensing and providing location data for the LTA vehicle interceptor;
  at least one imaging device configured for gathering and providing imaging data of the NCLTA vehicle;
  a communications subsystem configured for transmitting the location data and the imaging data to the operator; and
  an on-board control subsystem in communication with, and configured for controlling, the navigation subsystem, the at least one imaging device and the communications subsystem under operator control.

20. The LTA vehicle interceptor of claim 16, wherein the power subsystem further comprises at least one battery and optionally a solar panel operably coupled to the at least one battery.

21. The LTA vehicle interceptor of claim 16, wherein the puncturing effector is selected from the group consisting of: knife, needle, spear, arrow and bolt.

22. The LTA vehicle interceptor of claim 16, wherein the puncturing effector is connected to a distal end of a movable arm secured to the interceptor payload by a proximal end of the movable arm, the puncturing effector movable in any direction under operator control.

23. A method for intercepting a non-cooperative lighter-than-air (NCLTA) vehicle including an envelope configured for up to stratospheric buoyancy and a threat payload suspended from the envelope by rigging, the method comprising:
  providing a lighter-than-air (LTA) vehicle interceptor configured for intercepting the NCLTA vehicle and the threat payload operating aerially above ground, the LTA vehicle interceptor further configured with a plurality of effectors for engaging the NCLTA vehicle and/or the threat payload;
  deploying the LTA vehicle interceptor from a location below the NCLTA vehicle;
  navigating the LTA vehicle interceptor to within an operational distance away from the NCLTA vehicle;
  engaging the NCLTA vehicle and/or the threat payload with at least one of the plurality of effectors to disable the NCLTA vehicle;
  securing the threat payload to the LTA vehicle interceptor; and
  returning the threat payload safely to the ground.

24. The method of claim 23, wherein the plurality of effectors comprises at least one each of: a severing effector, a grasping effector and a puncturing effector.

* * * * *